United States Patent [19]

Werner

[11] 4,225,182

[45] Sep. 30, 1980

[54] POWER DRIVEN ADJUSTER FOR A BACKREST OF A VEHICLE SEAT

[75] Inventor: Paul Werner, Remscheid, Fed. Rep. of Germany

[73] Assignee: Keiper Automobiltechnik GmbH & Co. KG, Remscheid, Fed. Rep. of Germany

[21] Appl. No.: 926,850

[22] Filed: Jul. 21, 1978

[30] Foreign Application Priority Data

Jul. 30, 1977 [DE] Fed. Rep. of Germany ....... 2734568

[51] Int. Cl.² ........................................... A47C 1/025
[52] U.S. Cl. ..................................... 297/362; 74/805
[58] Field of Search ............... 297/361, 362, 330, 373, 297/374, 366, 367, 354, 355; 16/139, 140, 143; 74/804, 805

[56] References Cited

U.S. PATENT DOCUMENTS

| 2,170,951 | 8/1939 | Perry ..................................... 74/804 |
| 3,019,594 | 2/1962 | Sundt ................................. 74/804 X |
| 3,037,400 | 6/1962 | Sundt ..................................... 74/804 |
| 3,432,880 | 3/1969 | Putsch et al. ..................... 297/366 X |
| 3,976,327 | 8/1976 | Wirtz et al. .......................... 297/366 |

FOREIGN PATENT DOCUMENTS

1091994 11/1967 United Kingdom ..................... 297/373

*Primary Examiner*—William E. Lyddane
*Attorney, Agent, or Firm*—Michael J. Striker

[57] ABSTRACT

A drive for an arrangement for adjusting the inclination of a backrest component of a vehicle seat includes a motor and a transmission interposed between the motor and an actuating member of a tilting device incorporated in a hinge which tiltably mounts the backrest component on a seat component of the vehicle seat. The transmission includes a support member which is stationarily mounted on one of the hinge members of the hinge and has an internal gear annulus, an eccentric member rotatably mounted on the support member, and a gear element which is mounted on an eccentric portion of the eccentric member, has an external gear annulus meshing with the internal gear annulus of the support member, and is connected to the actuating member of the tilting device for joint rotation and for relative radial displacement to the extent of the eccentricity of the eccentric portion. The gear element may have a plurality of pins affixed thereto, and an output element jointly rotatable with the actuating member may have a corresponding plurality of apertures therein which receive the pins and each of which has a diameter exceeding that of the pin received therein by twice the eccentricity of the eccentric portion of the eccentric member.

9 Claims, 2 Drawing Figures

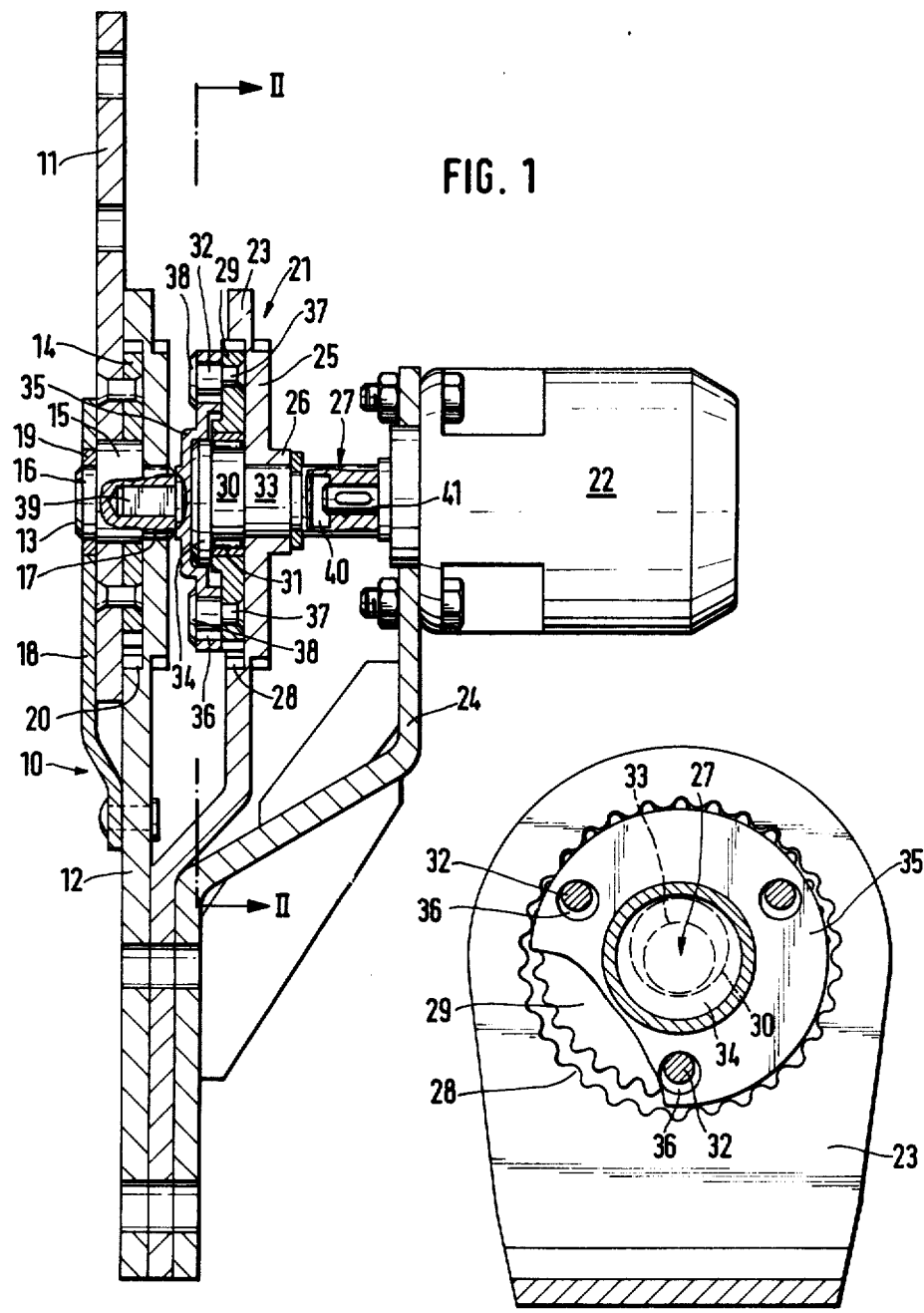

POWER DRIVEN ADJUSTER FOR A BACKREST OF A VEHICLE SEAT

BACKGROUND OF THE INVENTION

The present invention relates to a drive for adjusting the inclination of a backrest component of a seat in general, and particularly to a motor drive suited for use in vehicle seats.

There are already known various constructions of hinge arrangements which tiltably mount the backrest component on the seat component of the respective seat. It is also already known to incorporate tilting mechanisms into the hinge arrangements, which tilting mechanisms then adjust the inclination of the respective backrest component of the seat and hold the backrest component in its adjusted position. Then, it is also already known to utilize a motor for actuating the tilting mechanism, and to interpose a transmission between the motor and the tilting mechanism.

An example of a conventional backrest inclination adjusting arrangement of this type has been disclosed, for instance, in the German patent DT-PS 1,630,907 where a motor drive is being used for the adjustment of the angular position of the hinge member of the hinge arrangement which is connected with the backrest component of the seat. The motor drive revealed therein includes an electric motor and a reduction gear transmission interposed between the electric motor and the tilting device and which constitutes a structural unit with the electric motor. Inasmuch as it is desired that the tilting mechanism of the hinge arrangement be also manually actuatable by operating a handgrip when the electromotor becomes inoperative, the abovementioned reduction gear transmission can only be a spur gear transmission which can be jointly rotated when the handgrip is rotated, provided that a switching coupling, which requires the availability of additional space for its provision, is to be avoided. The spur gear reduction transmissions of this type assume, because of the necessarily great reduction ratio and the multitude of reduction stages which have to be provided in order to achieve the above-mentioned huge transmission ratio, a space in the vicinity of the hinge arrangement which has a relatively huge volume. For this reason, it is usually impossible to arrange the driving motor immediately at the hinge arrangement inasmuch as the required space is not available there. Thus, it is usually necessary to arrange the driving motor at such a location where the necessary space is readily available. When this expedient is resorted to, the connection between the driving motor, on the one hand, and the hinge arrangement, on the other hand, is established by flexible shafts or the like. Even though it is already possible to achieve a satisfactory performance of the backrest component inclination adjusting operation with respect to the adjusting torques and adjusting speeds by resorting to the use of the conventional motor drives of this type, there still exists the pronounced disadvantage that the dimensions of the reduction gear transmission are considerable, especially when high-speed electric motors are being used, as a result of the necessarily high transmission ratios. Under these circumstances, there is, as a rule, required a complex construction of the transmission which calls for expensive special driving trains. When a hinge arrangement is used at both sides of the seat, an additional problem is encountered which resides in the fact that, when the driving motor is assymetrically arranged, it is nevertheless to be assured that the flexible shafts have the same length in order to avoid precession or recession of one of the hinge arrangements with respect to the other hinge arrangement.

SUMMARY OF THE INVENTION

Accordingly, it is a general object of the present invention to avoid the disadvantages of the prior art.

More particularly, it is an object of the present invention to provide a drive for actuating a tilting mechanism of a hinge arrangement mounting a backrest component on a seat component of a seat for adjustment of inclination, which is not possessed of the disadvantages of the priorart drives used in the same environment.

A further object of the present invention is to so construct the gear transmission of the drive of this type as to have a high transmission ratio but also to have very small dimensions.

A concomitant object of the present invention is to so design the transmission as to be simple in construction, inexpensive to manufacture and to assemble, and reliable in operation nevertheless.

In pursuance of these objects and others which will become apparent hereafter, one feature of the present invention resides, briefly stated, in an arrangement for adjusting the inclination of a backrest component relative to a seat component of a seat, particularly a vehicle seat, which comprises, in combination, at least one hinge including two hinge members mounted on one another for relative tilting and each immovably connected to one of the components of the seat, and means for relatively tilting the hinge members, including an actuating member mounted on the hinge members for relative rotation; and means for rotating the actuating member, including a motor and a transmission interposed between the motor and the actuating member and including a support member stationarily mounted on one of the hinge members and having an internal gear annulus, an eccentric member mounted on the support member for rotation about a pivot axis and having an eccentric portion centered on an eccentric axis parallel to and radially offset from the pivot axis, a gear element mounted on the eccentric portion of the eccentric member for orbiting about the pivot axis and having an external gear annulus meshing with the internal gear annulus of the support member, and means for connecting the gear element to the actuating member of the hinge for joint rotation and for relative radial displacement to the extent of the eccentricity of the eccentric portion of the eccentric member. Advantageously, the support member and the gear element are so constructed that the crown circle of the external gear annulus of the gear element is smaller by at least one tooth height than the root diameter of the internal gear annulus of the support member, and that the eccentricity of the eccentric portion of the eccentric member substantially corresponds to the difference between the radius of the root circle of the internal gear annulus of the support member and the radius of the crown circle of the external gear annulus of the gear element. It is advantageous when the connecting means includes an output element, especially of a disc-shaped configuration, which is connected to the actuating member of the hinge for joint rotation, and means for coupling the output element with the gear element for the above-mentioned radial displacement and joint rotation. It is further advantageous when the output element is rotatably mounted on a mounting portion of the eccentric member which is preferably centered on the pivot axis of the eccentric member.

A reduction gear transmission of this type can be manufactured by resorting to the use of simple tools and has a very compact construction in that a high reduction transmission ratio can be achieved, for all intents and purposes, in only one reduction transmission stage by selecting the number of teeth of the internal gear annulus of the support member and of the external gear annulus of the gear element relatively high, and by giving the internal gear annulus only one tooth more than the external gear annulus. By using this particular reduction gear transmission, it is possible to utilize simple and commercially available motors for driving and tilting means of the hinge arrangement of the seat.

A transmission of the eccentric movement of the gear element to the output element of the reduction gear transmission, which is connectable with the actuating element of the tilting means, is avoided when the coupling means is so constructed as to include at least one projection affixed to one of the elements at a predetermined distance from the center of the one element and having a predetermined diameter, and by providing the other of the elements with at least one aperture receiving the projection of the one element, located at the same distance from the center of the other element and having a diameter exceeding that of the projection of the one element by twice the eccentricity of the eccentric portion of the eccentric member. However, it is particularly advantageous when more than one of the projection and of the aperture are provided, when all of the projections and apertures are located at the same distances from their respective centers of the element, and when all of the projections and all of the apertures are uniformly distributed about the respective centers of the elements. It is also advantageous when the respective projection is a portion of a pin which is affixed to the one element.

In order to fix the output element in the axial direction and thus to maintain the axial connection of the reduction gear transmission, the projection or each of the projections is provided with a collar on a free end portion thereof which is remote from the one element, the collar engaging the other element around the respective aperture. In this manner, the output element is securely connected with the gear element which, in turn, is turnably but axially unshiftably mounted on the eccentric portion of the eccentric member, so that the axial connection of the structural parts of the transmission is assured.

To transmit the adjusting torque to the actuating member of the tilting means of the hinge, the output element has, in accordance with a further feature of the present invention, a connecting portion which is detachably connected to the actuating member of the hinge and which is preferably centered on the pivot axis of the eccentric member of the transmission. The connecting portion of the output element may preferably have a non-circular cross section, and it may be received in a compatibly configurated receiving opening in the adjusting member of the hinge, so that even the coupling arrangement can be constructed in a spacesaving manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a longitudinal sectional view of an inclination adjusting arrangement of the present invention which includes a hinge and a reduction gear transmission of the present invention; and FIG. 2 is a view taken on line II—II of FIG. 1.

DESCRIPTION OF THE PREFERRED EMBODIMENTS

Referring now to the drawings in detail, and first to FIG. 1 thereof, it may be seen that the reference numeral 10 has been used to indicate a hinge in toto. The hinge 10 may be of the illustrated type, that is, it may include a tiltable hinge member 11 which is connectable with a non-illustrated backrest component of a seat, and a stationary hinge member 12 which is connectable with a seat component, which has also not been illustrated. In this connection, it is to be understood that the hinge members 11 and 12 could also be connected in a reverse arrangement, that is, the hinge member 12 to the seat component and the hinge member 11 to the backrest component. It is also to be understood that the characterization of the hinge members 11 and 12 as being stationary or immovable with respect to the seat or backrest components need not necessarily be accurate in the absolute sense; rather, for instance, the hinge member 11 or 12 which is associated with the seat component of the seat may be pivotally mounted on the seat so that the entire hinge 10 can be pivoted, together with the backrest component, relative to the seat component into a frontwardly collapsed position, for instance, to give rear-seat passangers of a two-door passanger car access to the rear seats. However, when only the inclination of the backrest component is to be adjusted, the hinge members 11 and 12 will indeed be immovable with respect to the associated components of the seat.

The hinge member 11 is tiltably mounted on the hinge member 12 by means of an actuating member 13. A spur gear 14 is rigidly connected with the tiltable hinge member 11. The spur gear 14 is mounted, together with the hinge member 11, on an eccentric portion 15 of the actuating member 13. The actuating member 13 has, on both axial sides of its eccentric portion 15, a centric portion 16 and 17 of which the one centric portion 17 is rotatably mounted in the stationary hinge member 12 and the other centric portion 16 is rotatably supported in a support bracket 18 which is rigidly connected with the stationary hinge member 12 and laterally embraces the tiltable hinge member 11. The bearing location in the support bracket 18 is constituted by a bearing sleeve 19 which is pressed into the support bracket 18.

The stationary hinge member 12 has an internal gear annulus 20 which is concentric to the bearing locations for the actuating member 13. The root diameter of the internal gear annulus 20 is smaller at least by one tooth height than the crown diameter of the external gear annulus of the spur gear 14. In order to maintain the external gear annulus of the spur gear 14 in meshing engagement with the internal gear annulus 20, the eccentricity of the eccentric portion 15 with respect to the centric portion 16 and 17 is selected to approximately correspond to the difference between the radius of the root circle of the internal gear annulus 20 and the radius of the crown circle of the external gear annulus of the spur gear 14. When the actuating member 13 rotates, the meshing region of the external gear annulus of the spur gear 14 with the internal gear annulus 20 of the stationary hinge member 12 orbits as a result of the eccentric movement of the spur gear 14. As a result of this, there are obtained the known conditions with respect to self-locking and transmission reduction.

The actuating member 13 of the hinge member 10 can be set in rotation by means of a reduction gear transmission 21 from a motor drive. The motor drive of the illustrated embodiment of the present invention is constructed as an electric motor 20. One of the parts of the reduction gear transmission 21 is a support member 23 which is connected, together with a motor-supporting bracket 24 and the stationary hinge member 12, on a non-illustrated frame of the seat component. The support member 23 is provided with a plate-shaped, preferably a stamped, disc 25 in the center of which there is formed a support collar 26 bounding a bearing bore for supporting an eccentric member 27. The support member 23 is provided, coaxially to the bearing bore of the disc 25, with an internal gear annulus 28 which meshes with a spur gear element 29. The gear element 29 is mounted on an eccentric portion 30 of the eccentric member 27, for instance, by means of a roller bearing 31.

In the illustrated exemplary embodiment of the present invention, the gear element 29 is equipped with three pins 32 which extend from the gear element 32 on its side which faces away from the disc 25. The pins 29 are distributed on a circle which is centered on the eccentric portion 30 of the eccentric member 27, and are connected to the gear element 29 by rivets. While a centric portion 33 of the eccentric 27 which adjoins the eccentric portion 30 of the eccentric 27 at one axial side serves the purpose of supporting the eccentric 27 in the support member 23, another centric portion 34 of the eccentric 27 which is located at the other axial side of the eccentric portion 30 of the eccentric 27 partially overlaps the anti-friction bearing 31 and the gear element 29 in the radial direction and serves for centric mounting of an output element 35.

The output element 35 has three apertures 36 which receive the pins 32 of the gear element 29. The apertures are uniformly distributed on a circle and have diameters which exceed those of the pins 32 received therein by twice the eccentricity of the eccentric portion 30. It is to be understood that the diameter of the circle on which the pins 32 are located is identical to that of the circle along which the apertures 36 are uniformly distributed. Similarly to the conditions prevailing in the hinge member 10, the root diameter of the internal gear annulus 28 is greater by at least one tooth height than the crown diameter of the external gear annulus of the gear element 29 even in the reduction gear transmission 21 and, similarly, the number of teeth of the internal gear annulus 28 is greater by at least one than the number of teeth of the external gear annulus of the gear element 29. Furthermore, the eccentricity of the eccentric portion 30 with respect to the centric portions 33 and 34 of the eccentric 27 approximately corresponds to the difference between the radius of the root circle of the internal gear annulus 28 and the radius of the crown circle of the external gear annulus of the gear element 29.

For the purpose of connecting the pins 32 to the gear element 29, each of the pins 22 has a mounting portion 37 by means of which it is riveted in a corresponding bore of the gear element 29. The respective pin 32 is provided, at its other end, with a collar 38 which extends beyond the periphery of the respective aperture 36 of the output element 35 in order to hold the same in the axial direction with respect to the centric portion 34 of the eccentric 27.

The output element 35 is provided, coaxially with the pivot axis of the eccentric 27, with a coupling portion 39 which has, in the illustrated exemplary embodiment, a square cross-section and is received in a corresponding recess in the actuating member 13 of the hinge 10 for transmission of torque. The centric portion 33 of the eccentric 27 is, in the illustrated example of the embodiment of the present invention, extended outwardly so as to embrace the support member 23 and is provided with a recess 40 into which an output stub shaft 41 of the motor 22 extends, a torque-transmitting relation between the eccentric 27 and the stub shaft 41 being established, for instance, by a groove and key arrangement.

The gear element 29 turns by an angular distance corresponding to one tooth during each rotation of the stub shaft 41 of the motor 22, provided that the external gear annulus of the gear element 29 has a nuber of teeth smaller by one than the internal gear annulus 28 of the support member 23. Thus, when the number of the teeth of the external gear annulus of the gear element 29 is large relative to the difference between the number of teeth of the internal gear annulus 28, it is possible to obtain a considerable reduction transmission ratio between the speed of rotation of the motor 22 and the speed of rotation of the coupling portion 39. Inasmuch as the reduction transmission ratio is similarly selected even in the hinge 10 itself, there is obtained a total reduction gear ratio which, depending on the selected number of teeth, can be considerable. So, for instance, when the number of teeth of the external gear annuli of the spur gear 14 and of the gear element 29 is selected to be sixty, and the number of teeth of the internal gear annuli 20 and 28 are selected to be sixty-one, the total reduction gear ratio is greater than 1:3500. Thus, it is possible to obtain, by resorting to the use of the above-described compact and minimum space assuming reduction gear transmission 21, reduction gear ratios of this order of magnitude.

It will be understood that each of the elements described above, or two or more together, may also find a useful application in other types of constructions differing from the types described above.

While the invention has been illustrated and described as embodied in a reduction transmission for use in conjunction with a tilting mechanism of a hinge used in a motor vehicle seat for adjustably mounting the backrest component on the seat component of the seat, it is not intended to be limited to the details shown, since various modifications and structural changes may be made without departing in any way from the spirit of the present invention. So, for instance, it is possible and contemplated by the present invention to use, instead of the above-described coupling members at the input or output end of the reduction gear transmission, other coupling arrangements, such as, for instance, cased-butt couplings, sleeve couplings, disc couplings or the like. In addition thereto, the construction of the used hinge can be different from the illustrated and above-discussed one.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for adjusting the inclination of a backrest part relative to a seat part of a motor vehicle seat, including two hinge members secured, respectively, to said seat parts, a rotary first actuation member having a centric portion bearing for rotation on one of said hinge members and an eccentric portion supporting for rotation the other hinge member, a first internal gear formed on said one hinge member around said centric portion and a first spur gear formed on said other hinge member around said eccentric portion, said spur gear being smaller in diameter than said internal gear and being in mesh with the latter, a combination comprising a reduction transmission including a support member secured to said one hinge member and being formed with a second internal gear corresponding in diameter to said first internal gear; a rotary second actuation member having a first centric portion bearing for rotation on said support member at the center of said internal gear, an intermediate eccentric portion and a second centric portion; a second spur gear corresponding in diameter to said first spur gear and being supported for rotation on said intermediate eccentric portion and in mesh with said second internal gear; and means for connecting said second spur gear to said first actuating member.

2. A combination as defined in claim 1, further comprising an additional support member secured to said one hinge member and a driving motor mounted on said additional support member and connected to said second actuation member.

3. The combination as defined in claim 1, wherein the crown circle of said spur gears is smaller by at least one tooth height than the root diameter of said internal gears; and wherein the eccentricity of said eccentric portions of respective actuation members substantially corresponds to the difference between the radius of the root circle of respective internal gears and the radius of the crown circle of corresponding external gears.

4. A combination as defined in claim 1, wherein said connecting means includes an output element which is connected to said first actuating member for joint rotation, and means for coupling said output element with said gear element for radial displacement in the range of eccentricity of said eccentric portions and for joint rotation.

5. A combination as defined in claim 4, wherein said output element is disc-shaped.

6. A combination as defined in claim 4, wherein said coupling means includes at least one projection affixed to said second spur gear at a predetermined distance from the center thereof and having a predetermined diameter; and wherein said output element has at least one aperture receiving said projection, said receiving aperture being located at said distance from the center of said second spur gear and having a diameter exceeding that of said projection by twice the eccentricity of said eccentric portion of said eccentric member.

7. A combination as defined in claim 6, wherein said coupling means further includes at least one additional projection identical with said projection; and wherein said output element has at least one additional aperture identical to said aperture and receiving said additional projection.

8. A combination as defined in claim 7, wherein said additional projection and said additional aperture are located at said distance from the center of said second actuation member.

9. A combination as defined in claim 8, wherein all of said projections and all of said apertures are uniformly distributed about said center.

* * * * *